US012394236B2

United States Patent
Singh et al.

(10) Patent No.: US 12,394,236 B2
(45) Date of Patent: Aug. 19, 2025

(54) PERSONALIZED FORM ERROR CORRECTION PROPAGATION

(71) Applicant: Adobe Inc., San Jose, CA (US)

(72) Inventors: Silky Singh, Noida (IN); Surgan Jandial, Noida (IN); Shripad Vilasrao Deshmukh, Delhi (IN); Milan Aggarwal, Pitampura (IN); Mausoom Sarkar, Noida (IN); Balaji Krishnamurthy, Noida (IN); Arneh Jain, Calicut (IN); Abhinav Java, Noida (IN)

(73) Assignee: Adobe Inc., San Jose, CA (US)

( * ) Notice: Subject to any disclaimer, the term of this patent is extended or adjusted under 35 U.S.C. 154(b) by 259 days.

(21) Appl. No.: 18/140,143

(22) Filed: Apr. 27, 2023

(65) Prior Publication Data
US 2024/0362941 A1    Oct. 31, 2024

(51) Int. Cl.
G06V 30/19        (2022.01)
G06V 30/14        (2022.01)
G06V 30/262       (2022.01)
G06V 30/414       (2022.01)

(52) U.S. Cl.
CPC ........ *G06V 30/274* (2022.01); *G06V 30/1444* (2022.01); *G06V 30/19147* (2022.01); *G06V 30/414* (2022.01)

(58) Field of Classification Search
None
See application file for complete search history.

(56) References Cited

U.S. PATENT DOCUMENTS

2004/0181749 A1* 9/2004 Chellapilla ........... G06F 40/174
                                                          715/222
2018/0365227 A1* 12/2018 Zheng ................... G06F 40/279

OTHER PUBLICATIONS

Aggarwal, Milan, et al., "Form2Seq : A Framework for Higher-Order Form Structure Extraction", Cornell University arXiv, arXiv.org [retrieved Feb. 20, 2023]. Retrieved from the Internet <https://arxiv.org/pdf/2107.04419.pdf>., Jul. 9, 2021, 11 Pages.

(Continued)

*Primary Examiner* — Andrew H Lam
(74) *Attorney, Agent, or Firm* — FIG. 1 Patents

(57) ABSTRACT

A corrective noise system receives an electronic version of a fillable form generated by a segmentation network and receives a correction to a segmentation error in the electronic version of the fillable form. The corrective noise system is trained to generate noise that represents the correction and superimpose the noise on the fillable form. The corrective noise system is further trained to identify regions in a corpus of forms that are semantically similar to a region that was subject to the correction. The generated noise is propagated to the semantically similar regions in the corpus of forms and the noisy corpus of forms is provided as input to the segmentation network. The noise causes the segmentation network to accurately identify fillable regions in the corpus of forms and output a segmented version of the corpus of forms having improved fidelity without retraining or otherwise modifying the segmentation network.

20 Claims, 7 Drawing Sheets

(56) References Cited

OTHER PUBLICATIONS

Aggarwal, Milan, et al., "Multi-Modal Association based Grouping for Form Structure Extraction", Cornell University arXiv, arXiv.org [retrieved Feb. 20, 2023]. Retrieved from the Internet <https://arxiv.org/pdf/2107.04396.pdf>., Jul. 9, 2021, 10 Pages.

Akhtar, Naveed, "Advances in adversarial attacks and defenses in computer vision: A survey", Cornell University arXiv, arXiv.org [retrieved Feb. 21, 2023]. Retrieved from the Internet <https://arxiv.org/pdf/2108.00401.pdf>., Sep. 2, 2021, 35 Pages.

Akhtar, Naveed, et al., "Threat of Adversarial Attacks on Deep Learning in Computer Vision: A Survey", Cornell University arXiv, arXiv.org [retrieved Feb. 21, 2023]. Retrieved from the Internet <https://arxiv.org/pdf/1801.00553.pdf>., Feb. 26, 2018, 21 Pages.

Goodfellow, Ian J, et al., "Explaining and Harnessing Adversarial Examples", Cornell University arXiv, arXiv.org [retrieved Feb. 21, 2023]. Retrieved from the Internet <https://arxiv.org/pdf/1412.6572.pdf>., Mar. 20, 2015, 11 Pages.

Hao, Yuying, et al., "EdgeFlow: Achieving Practical Interactive Segmentation with Edge-Guided Flow", Cornell University arXiv, arXiv.org [retrieved Feb. 21, 2023]. Retrieved from the Internet <https://arxiv.org/pdf/2109.09406.pdf>., Oct. 26, 2021, 10 Pages.

Jang, Won-Dong, et al., "Interactive Image Segmentation via Backpropagating Refinement Scheme", IEEE/CVF [retrieved Mar. 15, 2023]. Retrieved from the Internet <https://openaccess.thecvf.com/content_CVPR_2019/papers/Jang_Interactive_Image_Segmentation_via_Backpropagating_Refinement_Scheme_CVPR_2019_paper.pdf>., Jun. 2019, 10 Pages.

Java, Abhinav, et al., "One-Shot Doc Snippet Detection: Powering Search in Document Beyond Text", Cornell University arXiv, arXiv.org [retrieved Feb. 20, 2023]. Retrieved from the Internet <https://arxiv.org/pdf/2209.06584.pdf>., Sep. 12, 2022, 17 Pages.

Jiang, Dalei, et al., "Residual refinement for interactive skin lesion segmentation", Journal of Biomedical Semantics, London vol. 12 [retrieved Feb. 21, 2023]. Retrieved from the Internet <https://media.proquest.com/media/hms/PFT/1/e4EpL?_s=U8O9vZCLBWCTUU%2BbIVKWjJGHKUw%3D>., Dec. 18, 2021, 12 Pages.

Liu, Xin, et al., "Self-Error-Correcting Convolutional Neural Network for Learning with Noisy Labels", IEEE International Conference on Automatic Face & Gesture Recognition [retrieved Feb. 21, 2023]. Retrieved from the Internet <https://ieeexplore.ieee.org/abstract/document/7961730>., May 30, 2017, 7 Pages.

Majumder, Soumajit, et al., "Two-in-One Refinement for Interactive Segmentation", Institute of Computer Science II, University of Bonn, Germany [retrieved Feb. 21, 2023]. Retrieved from the Internet <https://www.bmvc2020-conference.com/assets/papers/0702.pdf>., 2020, 12 Pages.

Sarkar, Mausoom, et al., "Document Structure Extraction using Prior based High Resolution Hierarchical Semantic Segmentation", Cornell University arXiv, arXiv.org [retrieved Feb. 20, 2023]. Retrieved from the Internet <https://arxiv.org/pdf/1911.12170.pdf>., Sep. 17, 2020, 18 Pages.

Sofiiuk, Konstantin, et al., "F-BRS: Rethinking Backpropagating Refinement for Interactive Segmentation", Proceedings of the IEEE/CVF Conference on Computer Vision and Pattern Recognition [retrieved Mar. 15, 2023]. Retrieved from the Internet <10.1109/CVPR42600.2020.00865>., Jan. 2020, 10 Pages.

Sofiiuk, Konstantin, et al., "Reviving Iterative Training with Mask Guidance for Interactive Segmentation", Cornell University arXiv, arXiv.org [retrieved Mar. 15, 2023]. Retrieved from the Internet <https://arxiv.org/pdf/2102.06583.pdf>., Feb. 12, 2021, 15 Pages.

Szegedy, Christian, et al., "Intriguing properties of neural networks", Cornell University arXiv, arXiv.org [retrieved Feb. 21, 2023]. Retrieved from the Internet <https://arxiv.org/pdf/1312.6199.pdf>., Feb. 19, 2014, 10 Pages.

Zheng, Haizhong, et al., "Efficient Adversarial Training with Transferable Adversarial Examples", Cornell University arXiv, arXiv.org [retrieved Feb. 21, 2023]. Retrieved from the Internet <https://arxiv.org/pdf/1912.11969.pdf>., Jul. 2, 2020, 14 Pages.

Zhou, Mingyi, et al., "DaST: Data-free Substitute Training for Adversarial Attacks", Cornell University arXiv, arXiv.org [retrieved Feb. 21, 2023]. Retrieved from the Internet <https://arxiv.org/pdf/2003.12703.pdf>., Mar. 31, 2020, 10 Pages.

Zhou, Wen, et al., "Transferable Adversarial Perturbations", Computer Vision ECCV [retrieved Feb. 21, 2023]. Retrieved from the Internet <https://openaccess.thecvf.com/content_ECCV_2018/papers/Bruce_Hou_Transferable_Adversarial_Perturbations_ECCV_2018_paper.pdf>., Sep. 8, 2018, 16 Pages.

\* cited by examiner

500

502
Receive, from a segmentation network trained to segment an image of a form into different fillable regions, a segmented version of the form that includes at least one fillable region

504
Receive a correction to a region of the segmented version of the form

506
Generate noise for the segmented version of the form that represents the correction and superimpose the noise onto the segmented version of the form

508
Propagate the noise to semantically similar regions of a corpus of forms

510
Cause the segmentation network to generate a segmented version of the corpus of forms based on the noise superimposed on the semantically similar regions

*Fig. 5*

PERSONALIZED FORM ERROR CORRECTION PROPAGATION

BACKGROUND

Fillable form documents are a crucial part of communicating information between entities for many different industries, such as legal forms, banking forms, and so forth. With advances in computing device technology, forms that were previously used only in printed paper copies are now implemented as electronic documents to facilitate information communication, which was previously written via pen and paper, computing devices. With such advances, systems have been developed to automatically convert physical (e.g., paper) forms to electronic versions (e.g., Portable Document Format (PDF) versions of paper forms). However, existing systems for converting physical, paper forms to electronic versions are unable to accurately categorize paper forms and require user input to correct segmentation errors for each form converted to an electronic format.

SUMMARY

A corrective noise system is described that is configured to obtain an electronic version of a fillable form generated by a segmentation network and receive user input correcting one or more errors in the electronic version of the fillable form. The corrective noise system includes a noise generation model, which is trained to generate noise that represents corrections to the segmented version of a fillable form. The corrective noise system is trained to distill, from a segmented form that includes at least one correction, a noise that represents an intended change.

The corrective noise system is further trained to identify a region of a fillable form that includes a correction and propagate noise generated for the region to other regions of a corpus of forms that are semantically similar to the corrected region. Noise generated for one fillable form region is thus automatically propagated to all regions of a corpus of forms that are semantically similar to the corrected region (e.g., noise representing a correction to one check box is propagated to all check box regions in a corpus of forms, noise representing a correction to one text box is propagated to all text box regions in a corpus of forms, and so forth).

Noise representing the correction is then superimposed on the corrected region of the form as well as the semantically similar regions in the corpus of forms. The corpus of forms, with superimposed noise, are input to the segmentation network. The noise causes the segmentation network to accurately identify fillable regions in the corpus of forms and output a segmented version of the corpus of forms having improved fidelity (e.g., relative to a segmented version of the corpus of forms generated without the superimposed noise generated by the corrective noise system).

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In some implementations, entities represented in the figures are indicative of one or more entities and thus reference is made interchangeably to single or plural forms of the entities in the discussion.

FIG. 5 is a flow diagram depicting a procedure in an example implementation of generating a segmented version of a corpus of forms based on noise representing a correction to a single form generated by the corrective noise system of FIG. 1, using the techniques described herein.

DETAILED DESCRIPTION

Overview

Figure 1:
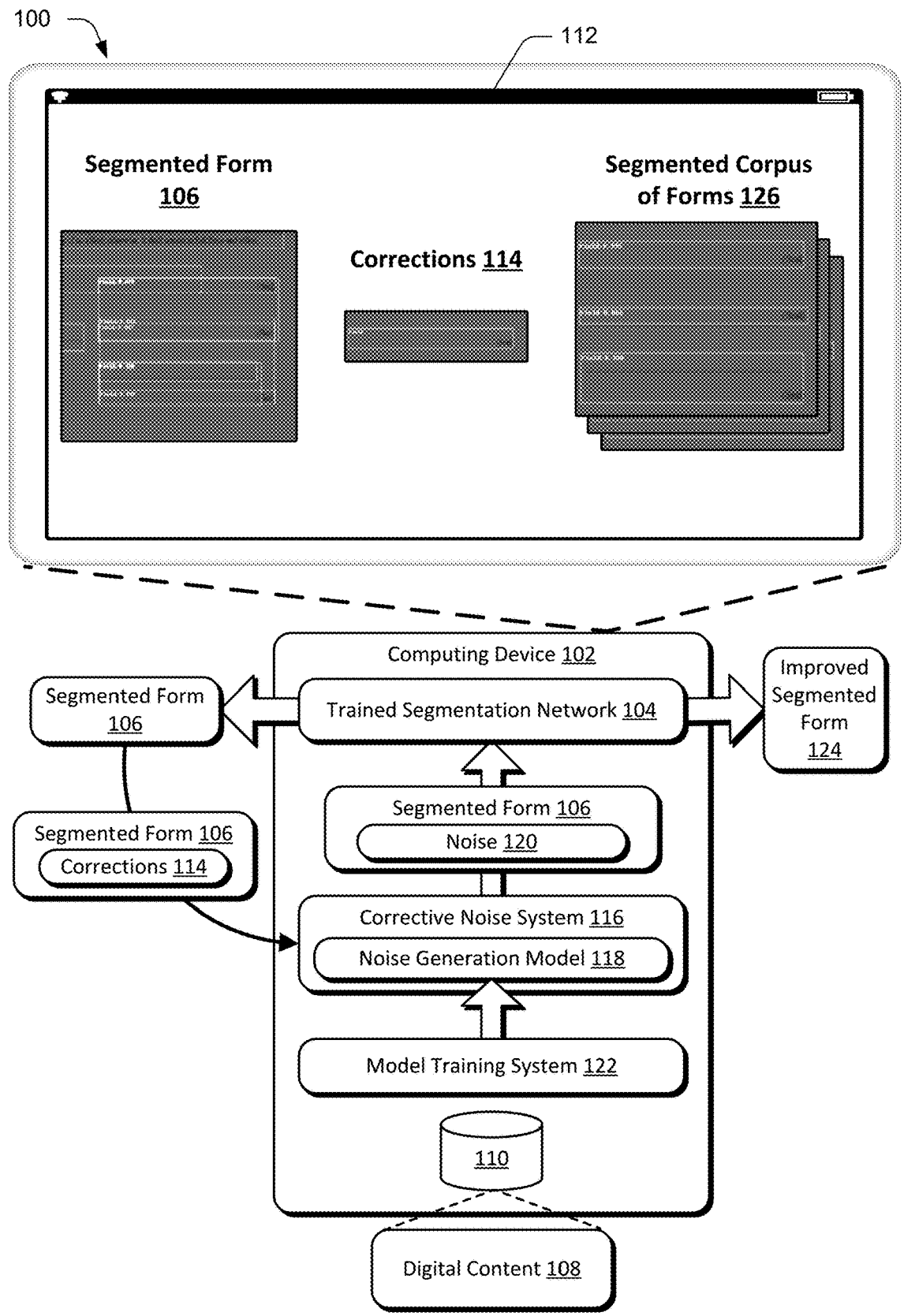
FIG. 1 is an illustration of a digital medium environment in an example implementation that is operable to employ a corrective noise system for generating a noisy version of a segmented form and a model training system configured to generate a noise generation model employed by the corrective noise system.

A fillable form document is a digital or electronic document that is designed with editable fields or sections (e.g., fillable regions) that can be completed or filled in with information (e.g., information input by users based on requests for information or other prompts included in the form). Fillable form documents are commonly used for collecting data or information from multiple individuals or entities in a standardized format. Fillable form documents are configurable as including different types of fillable regions, such as text boxes, checkboxes, dropdown menus, date fields, signature blocks, and so forth, which are individually populatable with relevant information.

Fillable form documents are used for a wide range of purposes, such as job applications, surveys, registration forms, feedback forms, contracts, and more. Fillable form documents provide a convenient mechanism for users to input information in a structured and organized manner, thus presenting information obtained from numerous (e.g., millions) of different users in a standardized manner. After information is input to a fillable form by a user, data representing the information can be submitted electronically, saved for future reference, or printed for physical submission, depending on the form's intended use and requirements.

With advances in computing device technology, forms that were previously configured in physical hard copies (e.g., printed paper forms) are now implemented as electronic documents configured in various formats, such as PDF formats, web-adaptive formats, mobile responsive formats, and so forth. Some conventional approaches to converting traditional hard copy forms into a digital or electronic format leverage segmentation networks to do so. Segmentation networks (e.g., semantic segmentation models) are deep learning algorithms that are trained to convert hard copy fillable forms into a digital format. Conventional processes for training such segmentation networks begin by obtaining a digital image of a hard copy fillable form (e.g., using a scanner, a camera, or other digital imaging device). In some conventional approaches, the digital image is pre-processed (e.g., resized, oriented in a certain manner, and so forth) to prepare the digital image of the form for segmentation network.

The segmentation network is then used to analyze the digital image of the form and identify different regions or segments of the form, such as text fields, checkboxes, signature blocks, and so forth. Generally, the segmentation process involves labeling individual pixels or regions in the image of the digital form with a corresponding class or category. After assigning each pixel or region with a corresponding class or category, post-processing to refine the results (e.g., smoothing edges of segmented regions). After an image of a fillable form has been segmented, the assigned classes or categories are used to designate various regions as "fillable" via user input (e.g., configured as a text box to receive text, configured as a check box to receive a binary selection, and so forth).

Text fields that include prompts for information at various regions of the fillable form are identified using optical character recognition to identify text and other static elements of the fillable form. Data representing the fillable regions and static elements of the fillable form are then used to generate a digital format of the fillable form (e.g., HTML, mobile responsive format, and so forth), which is made available for distribution in a digital format. This digitization enables entities to more efficiently collect information from users in a standardized manner and avoid manual data entry that is otherwise required to input data from a completed hard copy form (e.g., a filled-out paper fillable form) into a computing device.

While such conventional approaches for converting hard copy forms into digital versions represent an improvement over manually processing hard copy forms, these conventional approaches remain deficient. For instance, conventional segmentation networks output digital versions of fillable forms that include numerous errors, such as incorrectly placed and/or dimensioned bounding boxes that represent different fillable regions of a form. Other errors include outputting a digital version of a fillable form that incorrectly represents a single fillable region as multiple fillable regions, or vice versa (e.g., incorrectly representing multiple fillable regions as only a single fillable regions). Further example errors include failing to identify a fillable region, incorrectly classifying a fillable region as an incorrect type (e.g., classifying a check box as a text box), and so forth. To address these common errors, some conventional systems provide user interfaces with tools that enable a user to manually correct a digital version of a fillable form output by a segmentation network. However, these conventional editing systems for correcting segmentation network errors require users to individually edit each form output by the segmentation network, which is time consuming, tedious, and prone to human error, particularly when scaled to processing large corpuses of forms (e.g., a corpus of forms for an entity that includes millions of different forms).

To address these conventional shortcomings, a corrective noise system is described. The corrective noise system is configured to obtain an electronic version of a fillable form generated by a segmentation network, such as a segmentation network used by the conventional approaches described above. The corrective noise system includes a display module that is configured to output a display of the electronic version of the fillable form output by the segmentation network and receive user input correcting one or more errors in the electronic version of the fillable form generated by the segmentation network. For instance, the display module receives input using tools offered by conventional form editing systems to correct common errors (e.g., form editing tools for adjusting boundaries of segmented regions, correcting mislabeled segments by modifying a region type associated with a segmented region, adding fillable regions, removing fillable regions, and so forth).

The corrective noise system includes a noise generation model, which is trained to generate noise that represents user-provided corrections to the segmented version of a fillable form output by the segmentation network. To do so, the corrective noise system is trained to distill, from a segmented form that includes at least one correction, a noise that represents an intended change (e.g., as represented by the correction). The corrective noise system is further trained to identify a region of a fillable form that includes a correction and propagate noise generated for the region to other regions of the same form, a corpus of multiple forms, or a combination thereof, that are semantically similar to the corrected region. Noise generated for one fillable form region is thus automatically propagated to all regions of a corpus of forms that are semantically similar to the corrected region (e.g., noise representing a correction to one check box is propagated to all check box regions in a corpus of forms, noise representing a correction to one text box is propagated to all text box regions in a corpus of forms, and so forth).

The corrective noise system is further trained to superimpose the noise representing a correction to the corrected region of the form as well as semantically similar regions in the corpus of forms. The corpus of forms, with superimposed noise, are then provided as input to the segmentation network. The noise forces the segmentation network to accurately identify fillable regions in the corpus of forms, guided by corrections provided to a single form, and output a segmented version of the corpus of forms having improved fidelity relative to the segmented version of the corpus of forms generated by the segmentation network independent of (e.g., without) the noise generated by the corrective noise system.

Advantageously, by training the corrective noise system independent of training the segmentation network, the underlying machine learning model of the segmentation network is not altered or otherwise modified. This advantage provided by the corrective noise system thus enables a convenient way of efficiently propagating error correction among a corpus of forms without requiring retraining (e.g., changing internal weights) of the segmentation network. This advantage contrasts with conventional approaches to segmenting fillable forms, which require retraining or otherwise modifying the segmentation network, which involves significant computational resources and time to do so. Furthermore, the corrective noise system enables personalization of error correction for a particular entity without destructively altering the underlying segmentation network used to segment a corpus of forms. For instance, corrections made to a segmented fillable form that are particular to one entity's style of forms may contrast with a different entity's style of forms. In a conventional scenario where error correction involves retraining the segmentation network to identify corrections made by one entity, such a retraining process biases the segmentation network to the preferences of the entity—resulting in incorrectly propagating the entity's style to segmentation of a different entity's forms. The systems and techniques described herein thus enable personalizing how a corpus of forms are selected on an entity-specific basis, without requiring modification of an underlying segmentation network, thus enabling different entities to leverage the same segmentation network and customize form segmentation corrections as desired.

Term Examples

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

As used herein, a "fillable form region" refers to a distinct section or area within a form that is designated for the collection of specific data or information. In the context of digital forms, a fillable form region corresponds to a predefined area or field where users can input data, such as text, numbers, or selections, to provide responses or complete the form. Example fillable form regions are designed to capture specific types of information such as name, address, phone number, email address, date, or other relevant data, depending on the purpose and requirements of the form. Fillable form regions are typically delineated by boundaries or outlines to indicate a specific area where data is expected to be entered by users. Example types of fillable form regions include text fields, checkboxes, radio buttons, dropdown menus, or other interactive elements that allow users to input data in a structured manner.

As used herein, a "semantically similar region" of a form, relative to a given fillable form region, refers to regions that have similar or related appearances, content, or combinations thereof. Semantically similar regions thus serve a similar purpose or convey similar information, even in scenarios where a visual appearance or layout of different regions differs. Semantically similar regions may contain similar types of data or have a shared function in the form, such that semantically similar regions are expected (e.g., by an entity that develops the form) to be processed or analyzed in a similar manner.

As used herein, the term "noise" refers to a type of noise that is intentionally added or applied to an image for the purpose of mitigate or reducing an impact of other types of noise or imperfections. An example of noise includes digital image pixels that are selectable to have visual properties (e.g., color, luminance, intensity, etc.) that is similar to or distinct from a background pixel value of digital image content to which the noise is applied, similar to or distinct from adjacent noise to delineate boundaries for fillable form regions, or a combination thereof. "Noise," as used herein, thus refers to corrective noise added to compensate for errors output in a digitally segmented version of a fillable form.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld or wearable configuration such as a tablet, mobile phone, smartwatch, etc.), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is representative of a plurality of different devices, such as multiple servers utilized by an entity to perform operations "over the cloud."

The computing device 102 is illustrated as including a trained segmentation network 104. The trained segmentation network 104 is representative of functionality that automatically (e.g., independent of user input) generates an electronic version of a fillable form from an image of a hard copy (e.g., physical, non-digital) version of the fillable form. Example instances of the trained segmentation network 104 include segmentation networks described by Aggarwal et al. in Multi-modal association based grouping for form structure extraction, *Proceedings of the ICEE/CVF Winter Conference on Applications of Computer Vision,* 2020; Aggarwal et al. in Form2seq: A framework for higher-order form structure extraction, arXiv, 2021; and Sarkar, et al. in Document structure extraction using prior based high resolution hierarchical semantic segmentation, *In European Conference on Computer Vision,* 2020, the disclosures of which are hereby incorporated by reference. An example instance of an electronic version of a fillable form output by the trained segmentation network 104 is represented in FIG. 1 as segmented form 106.

In implementations, the segmented form 106 is generated based on a digital image of a fillable form (e.g., an image of a paper form that does not include digital information identifying different regions of the fillable form), where the digital image of the fillable form is stored as digital content 108 in storage 110 of the computing device 102. Alternatively or additionally, the digital image of the fillable form is representative of digital content 108 maintained in storage of a different computing device (e.g., a computing device communicatively coupled to the computing device 102). The storage 110 is further representative of a storage device configured to maintain data useable for a noise generation model that generates noise representing a correction to the segmented form 106, data representing a corpus of forms to which a correction is propagated, or combinations thereof, as described in further detail below.

The segmented form 106 includes at least one region that is identified by the trained segmentation network 104 as being "fillable" (e.g., configured to receive input specifying information prompted for entry by the form), such as a checkbox that is selectable to provide a binary (e.g., Yes/No) response to a prompt for information, a textbox that receives textual input to a prompt for information, a signature block that receives a signature, and so forth.

In implementations, fillable regions of the segmented form 106 output by the trained segmentation network 104 are formatted based on a respective region type identified by the trained segmentation network 104. For instance, fillable regions that are identified as prompting a user for input defining a date are output in the segmented form 106 as configured to receive numerical input in a certain format (e.g., MM-DD-YYYY). As another example, fillable regions that are identified as checkboxes prompting a user for selecting an option presented in the form are output in the segmented form 106 as selectable fields that have a first visual appearance when not selected (e.g., an empty box) and a second visual appearance when selected (e.g., a checked box, a filled box, and so forth). Although described with respect to specific examples of region types (e.g., text boxes, checkboxes, signature blocks, etc.), these examples are not limiting and the techniques described herein are extendable to any type or format of fillable form region.

An example instance of the segmented form 106 as output by the trained segmentation network 104 is depicted in FIG. 1 at display 112 of the computing device 102. Specifically, the display 112 depicts an example of a portion of the segmented form 106 that includes three different signature blocks, where the trained segmentation network 104 has incorrectly identified the three different signature blocks as being five different fillable regions in the segmented form 106, an example of which is illustrated and described in further detail below with respect to FIG. 4. The example instance of the segmented form 106 output by the trained segmentation network 104 thus represents how the trained segmentation network 104 often generates errors that incorrectly represent an underlying form from which the segmented form 106 was generated.

To rectify such in the segmented form 106 output by the trained segmentation network 104, corrections 114 are made to the segmented form 106. The segmented form 106, as corrected by the corrections 114, is useable by a corrective noise system 116 to generate noise that represents the corrections 114. In some implementations, the corrective noise system 116 is configured to facilitate provision of the corrections 114, such as by outputting a display of the segmented form 106 in a user interface that includes one or more tools for correcting errors associated with segmented regions identified by the trained segmentation network 104.

For instance, the corrective noise system 116 offers functionality similar to that provided by Adobe's Automated Forms Conversion Service "Review and Correct Tool." As an example, the corrective noise system 116 is configured to output a display of the segmented form 106 generated by the trained segmentation network 104 together with a visual indication of each fillable region identified by the trained segmentation network 104 (e.g., a visual display of a size and a position of a bounding box representing a fillable region, information describing a region type of the fillable region as identified by the trained segmentation network 104, and so forth). Continuing this example, the corrective noise system 116 displays the segmented form 106 in a user interface that includes tools for modifying a fillable region identified by the trained segmentation network 104, such as drag-and-drop tools that enable modifying a position and/or dimensions of a fillable region bounding box, a properties tool that enables modifying properties such as a region type of a fillable region, a tool to add a fillable region not identified by the trained segmentation network 104, a tool to delete a fillable region erroneously identified by the trained segmentation network 104, combinations thereof, and so forth. In FIG. 1, the display 112 depicts an example of corrections 114 made to one of the signature blocks depicted in the displayed segmented form 106, where the corrections 114 define appropriate dimensions and a position for a bounding box of a fillable signature block region of the segmented form 106.

Alternatively or additionally, in some implementations the corrections 114 are made to the segmented form 106 via a computing device, service, or system other than the corrective noise system 116 and the corrective noise system 116 receives the segmented form 106 together with the corrections 114. The corrective noise system 116 includes a noise generation model 118 that is configured to generate noise 120 representing the corrections 114. The noise 120 represents digital image pixels generated by the noise generation model 118 that provide semantic structure that is identified by the trained segmentation network 104 as corresponding to fillable form regions.

For instance, in an example implementation where the corrections 114 modify dimensions of a region bounding box included in the segmented form 106, the noise 120 includes pixels that provide sharp contrast along borders of the bounding box, as corrected by the corrections 114, such that the trained segmentation network 104 interprets the noise 120 as a clearly defined region for the segmented form. As another example, consider a scenario where the trained segmentation network 104 outputs a segmented form 106 that incorrectly classifies a check box and associated descriptive text for the check box (e.g., "check this box if the answer is yes") as a single fillable region. In this scenario, the corrections 114 specify that only the check box is to be designated as the fillable region (e.g., without the associated descriptive text). The noise 120 generated by the noise generation model 118 thus includes pixels that mask the associated descriptive text (e.g., using a color similar to a background color of the segmented form 106) and provide sharp borders for boundaries of the check box, thus causing the trained segmentation network 104 to identify only the check box without its associated descriptive text as a fillable region.

The noise 120 thus represents a corrective noise formatted according to a data type that the trained segmentation network 104 is configured to process as input (e.g., digital image data in the form of pixels), such that the trained segmentation network 104 identifies the corrections 114 without requiring retraining or otherwise adapting the trained segmentation network 104 to understand annotated corrections. Training of the noise generation model 118 to generate noise 120 representing corrections 114 to a segmented form 106 is performed by the model training system 122, as described in further detail below with respect to FIG. 3. Although depicted in the illustrated example of FIG. 1 as being implemented by the computing device 102 to generate the noise generation model 118, in some implementations the model training system 122 is implemented by a computing device other than the computing device 102 and the noise generation model 118 is received by the computing device 102 from the other computing device.

The corrective noise system 116 is configured to superimpose the noise 120 representing the corrections 114 on the segmented form 106 and provide the segmented form 106 with the superimposed noise 120 as input to the trained segmentation network 104, which causes the trained segmentation network 104 to output a version of the segmented form 106 that has improved fidelity relative to an original hard copy of the form that was input to the trained segmentation network 104. Advantageously, the corrective noise system 116 is further configured to automatically (e.g., independent of user input) identify one or more regions of the segmented form 106 that were corrected by the corrections 114 and identify, from a corpus of forms, regions in the corpus of forms that are semantically similar to the region(s) corrected by the corrections 114.

As described herein, a "semantically similar" region of a fillable form refers to regions that have similar or related appearances, content, or combinations thereof. Semantically similar regions thus serve a similar purpose or convey similar information, even in scenarios where a visual appearance or layout of different regions differs. Semantically similar regions may contain similar types of data or have a shared function in the form, such that semantically similar regions are expected (e.g., by an entity that develops the form) to be processed or analyzed in a similar manner. For example, in a fillable form for a job application, semantically similar regions include fields or sections that collect personal information such as name, address, and contact details for a job applicant. Even though the layout or visual appearance of the regions may differ when perceived by the human eye, they are semantically similar due to serving a common purpose of gathering personal information from the job applicant.

The corrective noise system 116 applies the noise 120 to each semantically similar region identified in a corpus of forms by superimposing the noise onto each semantically similar region. In implementations, applying the noise 120 to semantically similar regions in the corpus of forms includes adjusting the noise 120 to correspond to attributes of a particular semantically similar region, such as by adjusting dimensions of the noise, pixel values of the noise, combinations thereof, and so forth. In this manner, the corrective noise system 116 ensures that the noise is limited to a semantically similar region and does not extend to other portions of a form that are not semantically similar to the region corrected by the corrections 114. Each form with superimposed noise 120 is then provided as input to the trained segmentation network 104, which causes the trained segmentation network 104 to output an improved segmented form 124. The improved segmented form 124 represents an instance of the segmented form 106 that has an improved fidelity relative to a fillable form from which the segmented form 106 was originally generated.

In implementations, the improved segmented form 124 represents one form in a segmented corpus of forms 126 that includes numerous (e.g., millions) of different forms. By propagating the noise 120 to semantically similar regions in a corpus of forms, the techniques described herein cause the trained segmentation network 104 to remedy errors made in originally segmenting the corpus of forms using corrections 114 made to one or more regions of a single form (e.g., corrections to segmented form 106). For instance, in the illustrated example of FIG. 1, display 112 depicts how the corrections 114 pertain to a single signature block region in the segmented form 106. The display 112 further depicts how that single signature block region, as corrected by the corrections 114, is propagated to other regions in the segmented corpus of forms 126 that are identified as being semantically similar to the single signature block region (e.g., corrections 114 are propagated to all signature block regions in the segmented corpus of forms 126).

Having considered an example digital medium environment, consider now a discussion of example systems useable to generate a trained noise generation model, operation of the noise generation model to generate noise representing corrections to a segmented form region and propagate the noise to semantically similar regions in a corpus of forms, and using the noisy version of the corpus of forms to improve an output of the trained segmentation network.

Corrective Noise and Model Training Systems

Figure 2:
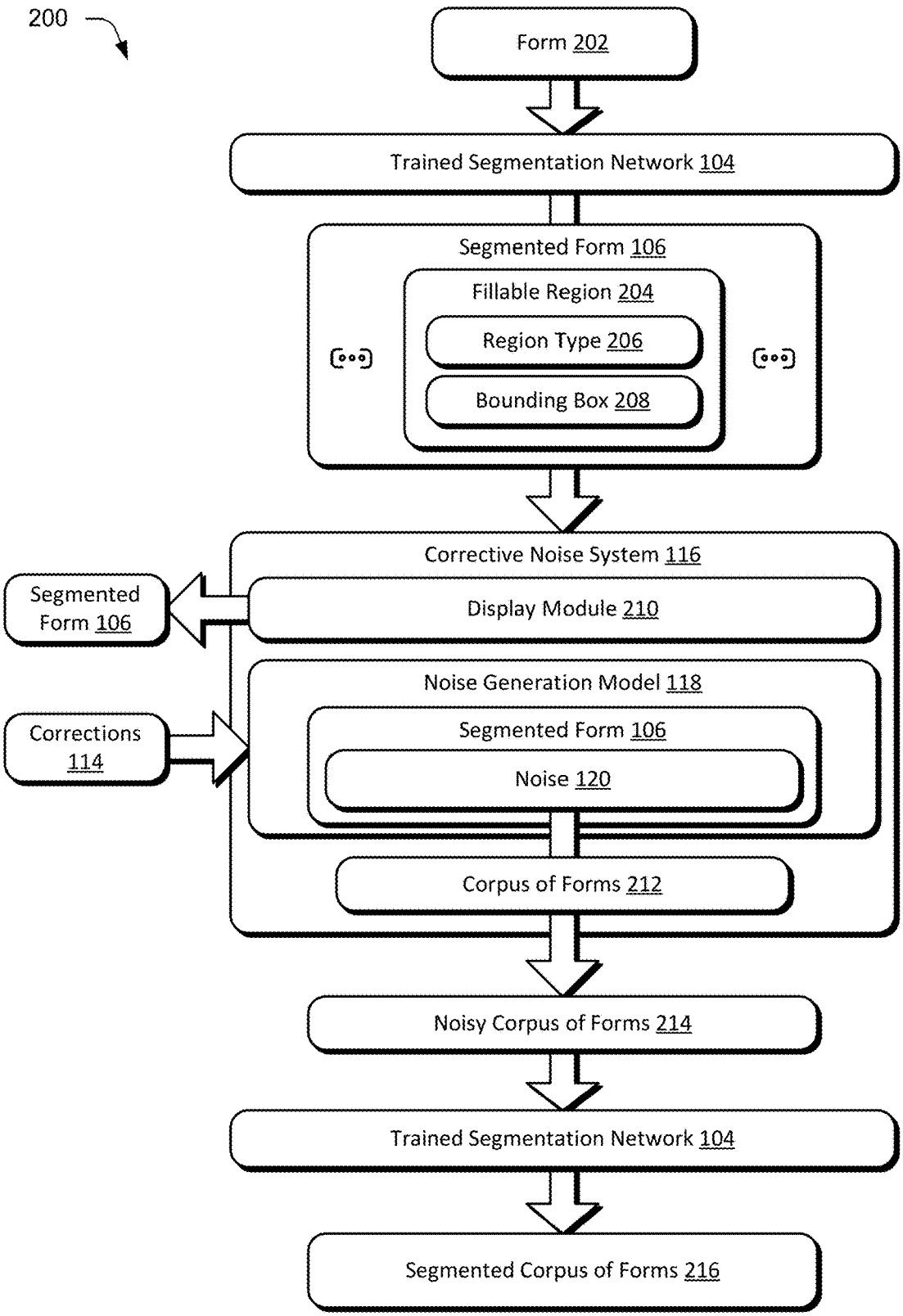
FIG. 2 depicts a digital medium environment showing operation of the corrective noise system of FIG. 1 generating a noisy corpus of forms based on a correction provided to a single form and of a trained segmentation network generating a segmented corpus of forms based on the noisy corpus of forms.

FIG. 2 depicts a digital medium environment 200 showing operation of the corrective noise system 116 generating a noisy corpus of forms based on a correction provided to a single form and of the trained segmentation network 104 generating a segmented corpus of forms based on the noisy corpus of forms.

Figure 3:
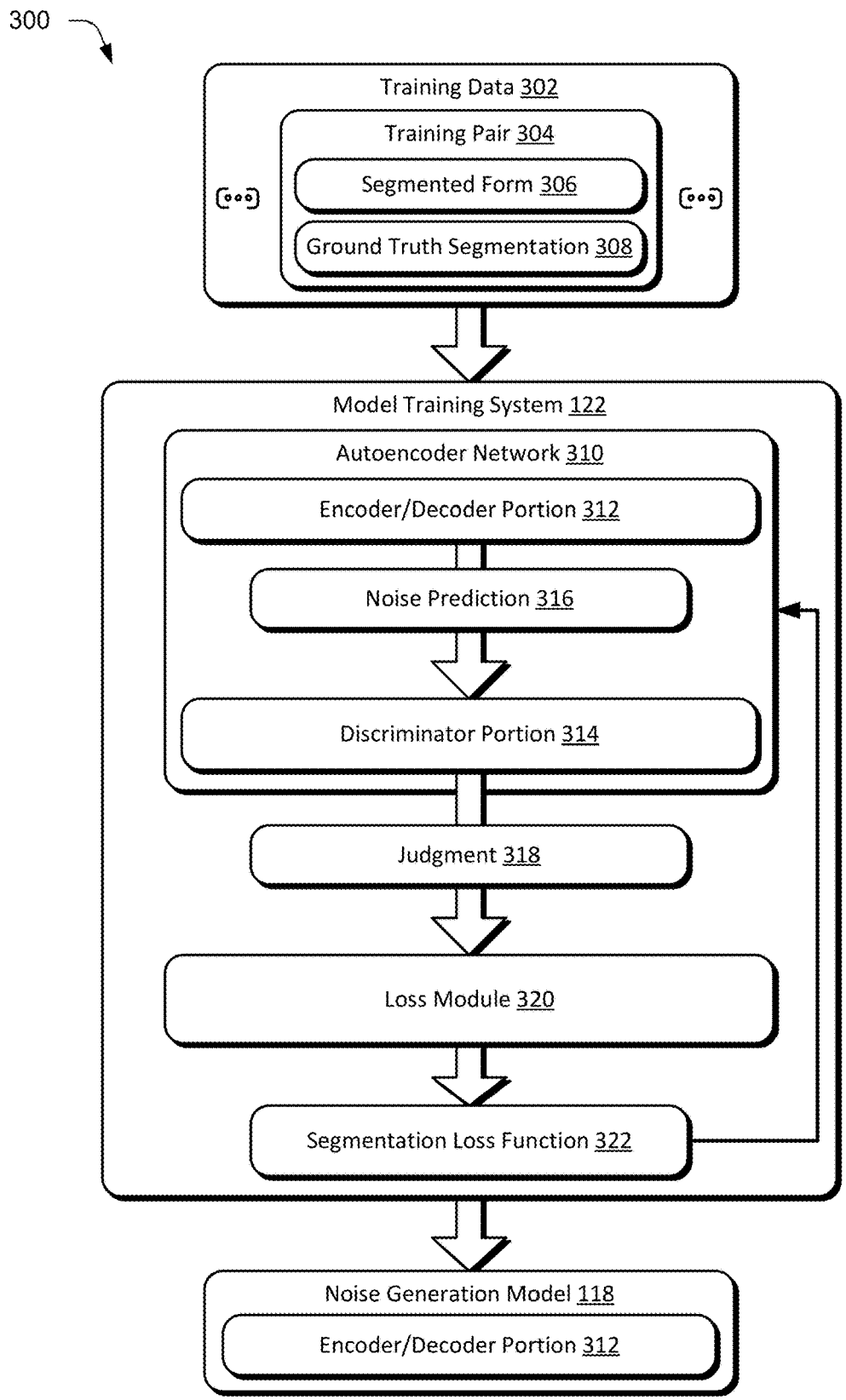
FIG. 3 depicts a digital medium environment showing operation of the model training system of FIG. 1 generating the noise generation model employed by the corrective noise system.

FIG. 3 depicts a digital medium environment 300 showing operation of the model training system 122 generating the noise generation model 118.

Figure 4:
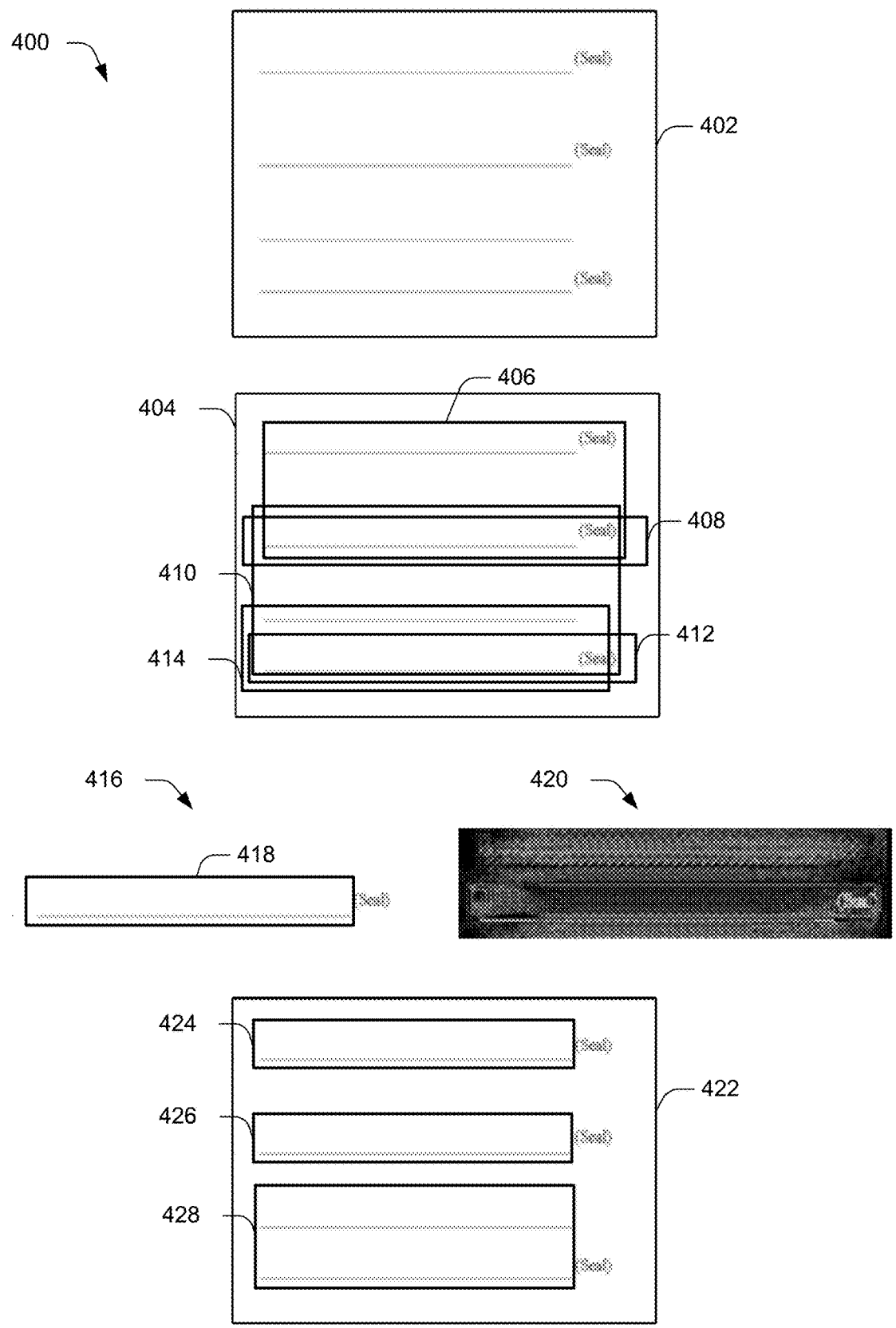
FIG. 4 depicts an example of a segmented form output by a segmentation network, noise representing a correction to the segmented form, and an improved version of the segmented form generated based on the noise.

FIG. 4 depicts an example 400 of a segmented form output by a segmentation network, noise representing a correction to the segmented form, and an improved version of the segmented form generated based on the noise.

As illustrated in FIG. 2, the trained segmentation network 104 receives a form 202 as input. The form 202 is representative of a digital image of a hard-copy form (e.g., a form physically printed on paper) that includes one or more regions prompting a user filling out the form to input information (e.g., name, date, signature, check box selection, and so forth). The trained segmentation network 104 is trained to generate, from the form 202, the segmented form 106.

The segmented form 106 output by the trained segmentation network 104 includes a fillable region 204 that has associated data describing a region type 206 of the fillable region 204 and a bounding box 208 for the fillable region 204 (e.g., a position and dimensions of the fillable region 204 relative to other regions or an overall layout of the segmented form 106). The trained segmentation network 104 is configured to output the segmented form 106 as including any number of fillable regions, as indicated by the ellipses adjacent to the fillable region 204 in the illustrated example of FIG. 2.

The segmented form 106 is then provided as input to the corrective noise system 116. The corrective noise system 116 includes a display module 210, which represents functionality of the corrective noise system 116 to output a display of the segmented form 106 (e.g., via display 112) together with a visual indication of each fillable region 204 and associated information as identified by the trained segmentation network 104.

For instance, in the illustrated example 400, portion 402 depicts an area of the form 202 processed by the trained segmentation network 104 to generate the segmented form 106. Specifically, portion 402 corresponds to an area of the form 202 that includes three different regions that are each designed to prompt input of a signature (e.g., as denoted by the text prompting a user filling out the form 202 to enter a "Seal" on an adjacent line). Portion 404 represents an area of the segmented form 106 generated by the trained segmentation network 104 from portion 402 and is depicted as including a plurality of different fillable regions 204, which are each represented by a different bounding box. Specifically, portion 404 includes bounding box 406, bounding box 408, bounding box 410, bounding box 412, and bounding box 414, which represent five different fillable regions identified by the trained segmentation network 104 as being included in the portion 402.

The display module 210 is configured to output a display of the portion 404, together with the bounding box 406, bounding box 408, bounding box 410, bounding box 412, and bounding box 414, thus conveying to a user of the corrective noise system 116 as to how the trained segmentation network 104 interpreted the portion 402. Although not depicted, the display module 210 further represents functionality of the corrective noise system 116 to display a user interface that includes controls configured to receive input defining one or more corrections 114 to the segmented form 106 (e.g., one or more controls for tools offered by provided by Adobe's Automated Forms Conversion Service "Review and Correct Tool").

The corrective noise system 116 is further depicted as including the noise generation model 118, which represents functionality of the corrective noise system 116 to generate noise 120 representing the corrections 114 and apply the noise 120 to the segmented form 106 (e.g., superimpose pixels of the noise 120 onto corresponding regions of the segmented form 106 corrected by the corrections 114). For instance, as illustrated in FIG. 4, view 416 depicts an example of a bounding box 418 resulting from corrections 114 made to bounding box 408. The bounding box 418 thus provides a tight border around a signature block that more accurately represents the middle signature block region in portion 402 relative to the border provided by bounding box 408.

View 420 depicts an example of noise 120 generated based on the corrections 114 that adjusted a size and position of the bounding box 408 to result in bounding box 418. As depicted at view 420, different pixel values (e.g., depicted via different colors in the view 420) of the noise 120 distinguish pixels of the segmented form 106 that correspond to the corrections 114 represented by bounding box 418 from other pixels that the corrections 114 indicate as being different from a fillable form region. Specifically, the noise 120 depicted in view 420 represents portions of the fillable region using purple pixels and differentiates from other portions of the form 202 using pixels that are blue, green, black, white, and so forth. Notably, the noise 120 depicted at view 420 distinguishes the textual prompt of "(Seal)," which was previously encompassed at least partially in bounding box 406, bounding box 408, bounding box 410, bounding box 412, and bounding box 414 from an area that should be designated as encompassed by the fillable signature block region of bounding box 418.

Returning to FIG. 2, in some implementations the corrective noise system 116 is configured to receive a corpus of forms 212. The corpus of forms 212 is representative of a collection of forms retrieved, for instance, from storage 110 of the computing device 102, from a computing device other than computing device 102, or a combination thereof. In implementations, the corpus of forms 212 represents a collection of forms that are associated with a same entity as the entity associated with the form 202. Alternatively, in some implementations the corpus of forms 212 includes forms associated with multiple different entities. The corrective noise system 116 is configured to identify a type of a fillable region 204 that was corrected by the corrections 114 (e.g., a type of the fillable region 204 to which the noise 120 was superimposed) and identify one or more regions in the corpus of forms 212 that are semantically similar to the corrected fillable region 204 of the segmented form 106. For instance, in some implementations, the corrective noise system 116 is configured to identify regions in the forms 212 that are semantically similar to a fillable region 204 corrected by the corrections 114 using techniques described by Java, et al. in "One-shot doc snippet detection: Powering search in document beyond text," arXiv, 2022, the disclosure of which is hereby incorporated by reference.

In response to identifying one or more regions in the corpus of forms 212 that are semantically similar to the fillable region 204 corrected by the corrections 114, the corrective noise system 116 generates a noisy corpus of forms 214 by propagating the noise 120 to the semantically similar regions in the corpus of forms 212. In some implementations, the segmented form 106 is included in the corpus of forms 212, such that corrections 114 to one fillable region 204 in the segmented form 106 is propagated to other semantically similar regions in the segmented form 106. In this manner, the corrective noise system 116 enables a user to provide corrections 114 to a single fillable region 204 of a segmented form 106 and is trained to generate noise 120 that represents the corrections 114, apply the noise 120 to the corrected fillable region 204, and propagate the noise 120 to other regions in the segmented form 106 or a larger corpus of forms 212 that are semantically similar to the corrected fillable region 204.

The noise 120 causes the trained segmentation network 104 to output a segmented corpus of forms 216 that each include one or more fillable regions 204 that have improved fidelity to a corresponding form in the corpus of forms 212, relative to a segmented corpus of forms generated by the trained segmentation network 104 using only the corpus of forms 212 as input (e.g., independent of the noise 120). For instance, in the illustrated example of FIG. 4, portion 422 depicts how the corrections 114 represented by bounding box 418 are propagated to other semantically similar regions (e.g., other signature block regions) of the portion 402 to generate an improved segmented form 124.

For instance, the portion 422 is depicted as including bounding box 424, bounding box 426, and bounding box 428, which respectively represent fillable regions for the three signature blocks included in portion 402. The bounding box 424, bounding box 426, and bounding box 428 represent an improved segmented form 124 relative to the segmented form 106 represented by portion 404 and its bounding boxes 406, 408, 410, 412, and 414. Notably, portion 422 represents functionality of the corrective noise system 116 to propagate noise 120 to regions that are semantically similar to, and visually different from, a region corrected by the corrections 114. For instance, while view 416 depicts how the corrections 114 adjusted a bounding box 418 for a signature block that includes only one line, bounding box 428 in portion 422 represents an improved segmentation of a fillable region for a signature block that includes two lines.

By propagating noise to fillable form regions that are semantically similar to a corrected region and providing the fillable forms with superimposed noise as input to the trained segmentation network 104, the techniques described herein advantageously enable generation of improved segmented forms without requiring retraining of the trained segmentation network 104. This enables different entities to leverage the same trained segmentation network 104 and limit error correction propagation to a corpus of forms associated with one entity without destructively altering the trained segmentation network 104 or otherwise biasing the trained segmentation network 104 to favoring corrections that are particular to the style of one entity. For a further description of training the noise generation model used by the corrective noise system 116 to generate noise representing the corrections 114, consider FIG. 3.

As depicted in the illustrated example of FIG. 3, the model training system 122 is configured to train the noise generation model 118 using training data 302. The training data 302 includes a plurality of training pairs, where each training pair 304 of the plurality of training pairs includes a segmented form 306 and a ground truth segmentation 308 for the segmented form 306. The segmented form 306 is representative of an instance of a segmented form generated by the trained segmentation network 104, such as segmented form 106 generated from form 202. The ground truth segmentation 308 represents a reference or benchmark describing the correct locations, dimensions, and region types of fillable regions included in the segmented form 306. In some implementations, the ground truth segmentation 308 for a segmented form 306 is manually generated (e.g., via user input defining positions, dimensions, types, etc. of fillable regions included in a form from which the segmented form 306 was generated).

In some implementations, the training data 302 is obtained from storage 110 of a computing device implementing the model training system 122 (e.g., computing device 102). Alternatively or additionally, the training data 302 is obtained from one or more computing devices other than the computing device implementing the model training system 122. Using the training data 302, the model training system 122 is configured to train an autoencoder network 310, which represents an artificial neural network that includes an encoder/decoder portion 312 and a discriminator portion 314.

The encoder/decoder portion 312 represents functionality of the autoencoder network 310 to transform input data into a lower-dimensional representation (e.g., a latent representation, a compressed representation, and the like). In the context of training the noise generation model 118, the encoder/decoder portion 312 is tasked with generating a noise prediction 316 that represents noise predicted by the encoder/decoder portion 312 to define one or more fillable regions in the segmented form 306 of a training pair 304 (e.g., a prediction of noise that would represent actual fillable regions as represented by the ground truth segmentation 308 of the training pair 304).

In some implementations, the encoder/decoder portion 312 of the autoencoder network 310 is configured with an architecture as described in Table 1:

TABLE 1

| Network Layer | Input Resolution | Output Resolution |
| --- | --- | --- |
| Conv2d | 1 × 28 × 28 | 8 × 26 × 26 |
| INstanceNorm2d + ReLu | 8 × 26 × 26 | 8 × 26 × 26 |
| Conv2d | 8 × 26 × 26 | 16 × 12 × 12 |
| INstanceNorm2d + ReLu | 16 × 12 × 12 | 16 × 12 × 12 |
| Conv2d | 16 × 12 × 12 | 32 × 5 × 5 |

TABLE 1-continued

| Network Layer | Input Resolution | Output Resolution |
| --- | --- | --- |
| INstanceNorm2d + ReLu | 32 × 5 × 5 | 32 × 5 × 5 |
| ResNetBlock × 4 | 32 × 5 × 5 | 32 × 5 × 5 |
| ConvTranspose2d | 32 × 5 × 5 | 16 × 11 × 11 |
| INstanceNorm2d + ReLu | 16 × 11 × 11 | 16 × 11 × 11 |
| ConvTranspose2d | 16 × 11 × 11 | 8 × 23 × 23 |
| INstanceNorm2d + ReLu | 8 × 23 × 23 | 8 × 23 × 23 |
| ConvTranspose2d | 8 × 23 × 23 | 1 × 28 × 28 |
| tanh | 1 × 28 × 28 | 1 × 28 × 28 |

As described in Table 1, in some configurations the encoder/decoder portion 312 architecture includes convolutional layers (Conv2d and ConvTranspose2d), instance normalization (INstanceNorm2d), activation functions (ReLu and tanh), and residual blocks (ResNetBlock). The input image (e.g., an image of the segmented form 306) has a size of 28×28 pixels with a single channel (e.g., grayscale). The first convolutional layer (Conv2d) applies filters to the input image, creating eight feature maps with a size of 26×26 pixels. Instance normalization and ReLu activation function are applied to the eight feature maps, keeping their size the same (8×26×26).

The second convolutional layer reduces the size of the feature maps to 16 maps with a size of 12×12 pixels. Instance normalization and ReLu activation function are applied again to these 16 feature maps, keeping their size the same (16×12×12). The third convolutional layer further reduces the feature maps to 32 maps with a size of 5×5 pixels. Instance normalization and ReLu activation function are applied once more to these 32 feature maps, keeping their size the same (32×5×5). Four residual blocks (ResNetBlock) are applied to the feature maps, maintaining the same size and number of feature maps (32×5×5). A transposed convolutional layer (ConvTranspose2d) is used to increase the size of the feature maps back to 16 maps with a size of 11×11 pixels.

Instance normalization and ReLu activation function are applied to these 16 feature maps, keeping their size the same (16×11×11). Another transposed convolutional layer increases the size of the feature maps to 8 maps with a size of 23×23 pixels. Instance normalization and ReLu activation function are applied to these 8 feature maps, keeping their size the same (8×23×23). A final transposed convolutional layer is used to generate a single output feature map with a size of 28×28 pixels, the same size as the original input (e.g., the image of segmented form 306). A tanh activation function is applied to the output feature map to obtain the noise prediction 316, which has the same size as the input (1×28×28). Such an architecture of the encoder/decoder portion 312 thus enables the autoencoder network 310 to generate a noise prediction 316 for a segmented form 306 of a training pair 304 while retaining an overall structure and size of the segmented form 306.

The discriminator portion 314 represents functionality of the autoencoder network 310 to process the lower-dimensional representation output by the encoder portion 312 (e.g., the noise prediction 316) and output a judgment 318 indicating whether the noise prediction 316 output by the encoder portion 312, when combined with the segmented form 306, creates a result that remains perceptible as a fillable form. In implementations, an architecture of the discriminator portion 314 is configured as a feedforward neural network (FNN), a convolutional neural network (CNN), a recurrent neural network (RNN), or the like.

The model training system 122 further includes a loss module 320 that is configured to compute a segmentation loss function 322 based on the noise prediction 316 and the judgment 318 output for a training pair 304. In implementations, the segmentation loss function 322 is expressed as L in Equation 1:

$$L = L_{CE}(\theta_S(x+\delta_x), g) + \log(D(x)) + \log(1 - D(x+\delta_x)) + \|\delta_x\|_2 \quad \text{(Eq. 1)}$$

In Equation 1, x represents the segmented form 306 of a training pair 304, as generated by a pre-trained structure extraction network $\theta_S$ (e.g., the trained segmentation network 104). $\delta_x$ represents the noise prediction 316 generated by the decoder portion 312 for the segmented form 306 and g represents the ground truth segmentation 308 for the training pair 304, where D represents the discriminator portion 314. In Equation 1, the first term represents the cross-entropy loss between the prediction of the trained segmentation network 104 and the noise prediction 316 relative to the ground truth segmentation 308.

The second and third terms in Equation 1 represent adversarial training of the noise generation model 118 using the discriminator portion 314. For instance, the second term forces the noise generation model 118 to learn the real distribution of segmented regions included in a segmented form 306 and the third term forces the encoder/decoder portion 312 to generate a reasonable noise prediction 316 to fool the discriminator portion 314. The fourth term penalizes the autoencoder network 310 by minimizing the $L_2$ norm of the noise prediction 316.

The segmentation loss function 322 is then applied during training of the autoencoder network 310 to adjust weights and biases of the autoencoder network 310 with an objective of minimizing the segmentation loss function 322. In this manner, the operations depicted in FIG. 3 represent a single training iteration for generating the noise generation model 118 and the model training system 122 is conf configured to perform the operations described with respect to FIG. 3 for as many training iterations as necessary until the autoencoder network 310 converges (e.g., until the noise prediction 316, when combined with the segmented form 306, achieves a threshold difference relative to the ground truth segmentation 308).

Upon achieving convergence, the encoder/decoder portion 312 of the autoencoder network 310 is output as the trained noise generation model 118 for use by the corrective noise system 116.

Having considered example systems and techniques, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4.

FIG. 5 is a flow diagram depicting a procedure 500 in an example implementation of generating a segmented version of a corpus of forms based on noise representing a correction to a single form generated using the techniques described herein.

To begin, a segmented version of a form that includes at least one fillable region is received from a segmentation network trained to segment an image of the form into different fillable regions (block 502). The corrective noise system 116, for instance, receives segmented form 106 from the trained segmentation network 104.

A correction is received to a region of the segmented version of the form (block 504). The corrective noise system 116, for instance, receives corrections 114 that rectify at least one error in the segmented form 106 as output by the trained segmentation network 104, such as a modification to a position of a bounding box for a fillable region 204, a modification to one or more dimensions of a fillable region 204, a modification to a region type 206 of a fillable region, or combinations thereof. In some implementations, the received corrections 114 pertain to multiple different fillable regions of the 106.

Noise that represents the correction to the segmented version of the form is generated and the noise is superimposed onto the segmented version of the form (block 506). The corrective noise system 116, for instances, leverages the noise generation model 118 to generate noise 120 that represents the corrections 114 and superimposes the noise 120 onto the segmented form 106 at corresponding positions of one or more fillable regions corrected by the corrections 114.

The noise is propagated to semantically similar regions of a corpus of forms (block 5080. The corrective noise system 116, for instance, identifies at least one region in the corpus of forms 212 that is semantically similar to a region in the segmented form 106 corrected by the corrections 114 and superimposes the noise 120 onto the semantically similar regions in the corpus of forms 212, resulting in the noisy corpus of forms 214.

The segmentation network is then caused to generate a segmented version of the corpus of forms based on the noise superimposed onto the semantically similar regions (block 510). The noisy corpus of forms 214, for instance, is input to the trained segmentation network 104, which causes the trained segmentation network 104 to output the segmented corpus of forms 216 that include fillable regions identified based on the corrections 114.

Figure 6:
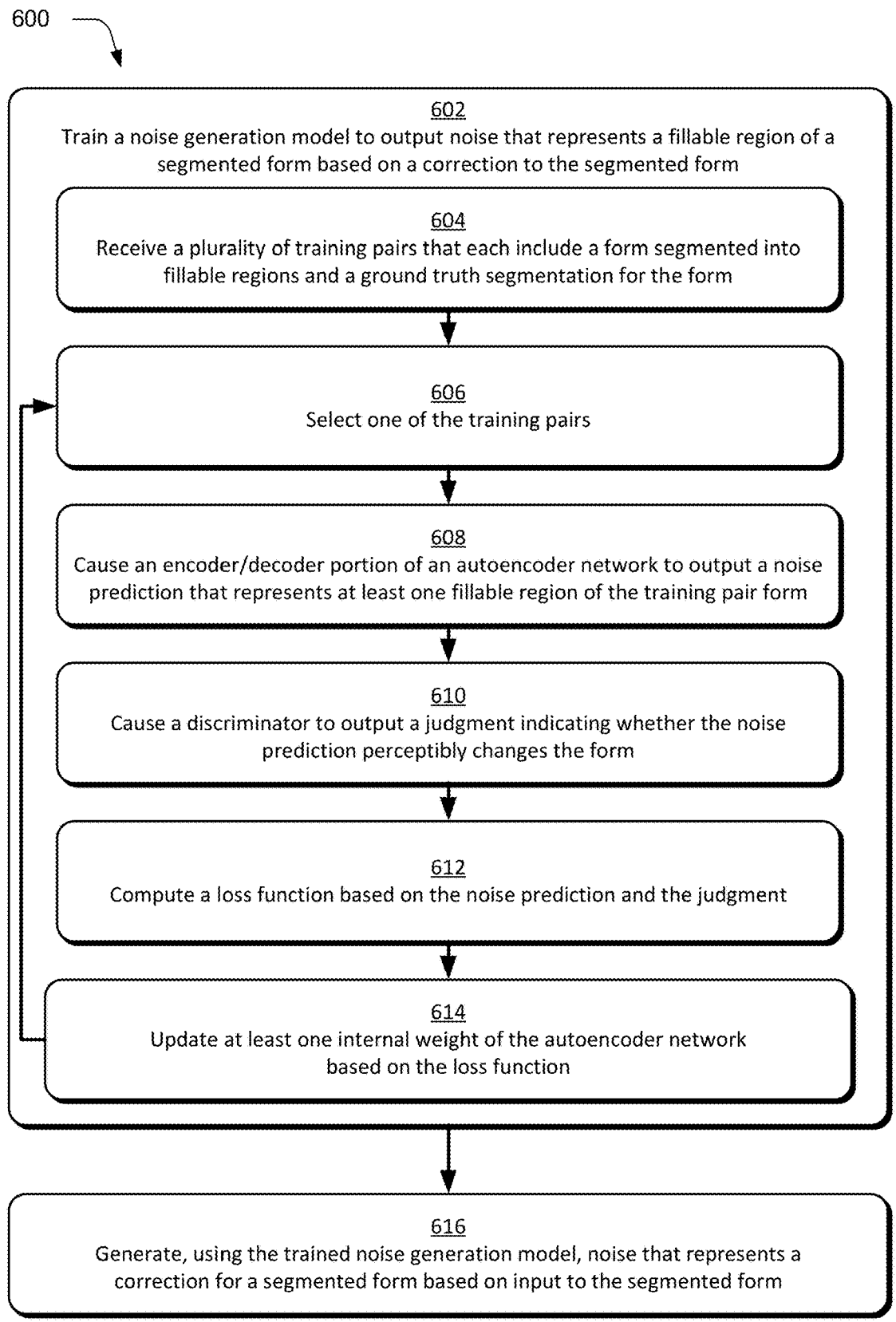
FIG. 6 is a flow diagram depicting a procedure in an example implementation of training a noise generation model and using the trained noise generation model to generate noise representing a correction to a segmented form using the techniques described herein.

FIG. 6 is a flow diagram depicting a procedure 600 in an example implementation of training a noise generation model and using the trained noise generation model to generate noise representing a correction to a segmented form using the techniques described herein.

A noise generation model is trained to output noise that represents a fillable region of a segmented form based on a correction to the segmented form (block 602). As part of training the noise generation model, a plurality of training pairs are received, where each training pair includes a form segmented into fillable regions and a ground truth segmentation for the form (block 604). The model training system 122, for instance, receives training data 302 that includes a plurality of training pairs 304, where each training pair 304 includes a segmented form 306 and a ground truth segmentation 308 for the segmented form 306.

One of the training pairs is selected (block 606). For the selected training pair, an encoder/decoder portion of an autoencoder network is caused to output a noise prediction that represents at least one fillable region of the training pair form (block 608). The encoder/decoder portion 312 of the autoencoder network 310, for instance, is caused to generate a noise prediction 316 for the segmented form 306 of the selected training pair 304.

For the selected training pair, a discriminator is caused to output a judgment indicating whether the noise prediction perceptibly changes the form of the training pair (block 610). The model training system 122, for instance, causes the discriminator portion 314 to output a judgment 318 that indicates whether the noise prediction 316, when combined with the segmented form 306 of the training pair 304, results in an electronic document that still appears as a fillable form.

A loss function is then computed based on the noise prediction and the judgment (block 612). The loss module 320, for instance, computes the segmentation loss function 322 based on the noise prediction 316 and the judgment 318 generated for the training pair 304. At least one internal weight of the autoencoder network is then updated based on the loss function (block 614). The model training system 122, for instance, modifies at least one internal weight of the autoencoder network 310 using the segmentation loss function 322 with an objective of minimizing the segmentation loss function 322 during a subsequent training iteration. Operation of procedure 600 then returns to block 606, where an additional training pair is selected and the flow of operations from block 606 to block 614 is repeated until the autoencoder network 310 achieves convergence, at which point the encoder/decoder portion 312 is output as the trained noise generation model (e.g., noise generation model 118).

The trained noise generation model is then used to generate noise that represents a correction for a segmented form based on input to the segmented form (block 616). The noise generation model 118, for instance, generates noise 120 based on one or more corrections 114 to the segmented form 106.

Having described example procedures in accordance with one or more implementations, consider now an example system and device to implement the various techniques described herein.

Example System and Device

Figure 7:
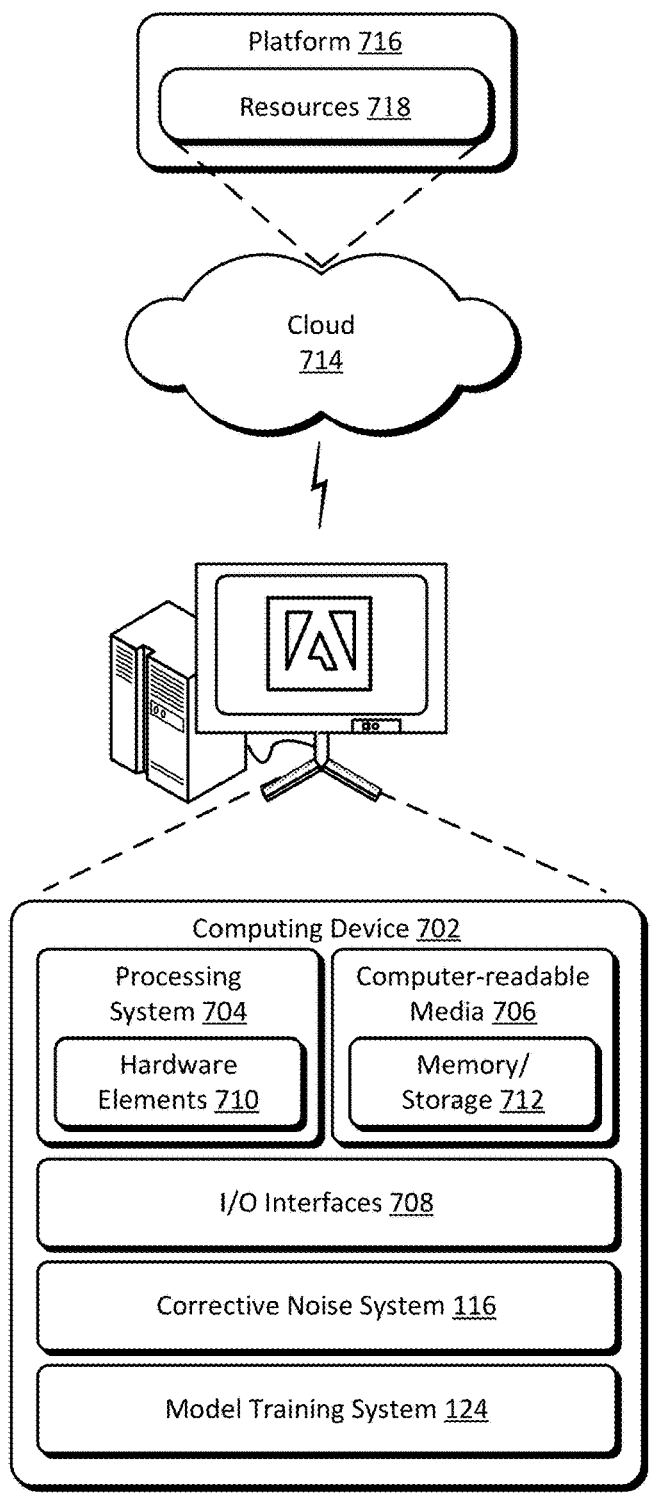
FIG. 7 illustrates an example system including various components of an example device to implement the techniques described with reference to FIGS. 1-6.

FIG. 7 illustrates an example system 700 that includes an example computing device 702, which is representative of one or more computing systems and/or devices that implement the various techniques described herein. This is illustrated through inclusion of the corrective noise system 116 and the model training system 122. The computing device 702 is configured, for example, as a service provider server, as a device associated with a client (e.g., a client device), as an on-chip system, and/or as any other suitable computing device or computing system.

The example computing device 702 as illustrated includes a processing system 704, one or more computer-readable media 706, and one or more I/O interface 708 that are communicatively coupled, one to another. Although not shown, the computing device 702 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that are configurable as processors, functional blocks, and so forth. For instance, hardware element 710 is implemented in hardware as an application specific integrated circuit or other logic device formed using one or more semiconductors. The hardware elements 710 are not limited by the materials from which they are formed, or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 706 is illustrated as including memory/storage 712. The memory/storage 712 represents memory/storage capacity associated with one or more computer-readable media. The memory/storage 712 is representative of volatile media (such as random-access memory (RAM)) and/or nonvolatile media (such as read only memory (ROM), Flash memory, optical disks, magnetic disks, and so forth). The memory/storage 712 is configured to include fixed media (e.g., RAM, ROM, a fixed hard drive, and so on) as well as removable media (e.g., Flash memory, a removable hard drive, an optical disc, and so forth). In certain implementations, the computer-readable media 706 is configured in a variety of other ways as further described below.

Input/output interface(s) 708 are representative of functionality to allow a user to enter commands and information to computing device 702 and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 702, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 710. The computing device 702 is configured to implement instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supported by various configurations of the computing device 702 and are not limited to the specific examples of the techniques described herein. This functionality is further configured to be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data that is utilized while computer processing is executed on servers that are remote from the computing device 702. Resources 718 also include services provided over the Internet and/or through a subscriber network, such as a cellular or Wi-Fi network.

The platform 716 is configured to abstract resources and functions to connect the computing device 702 with other computing devices. The platform 716 is further configured to abstract scaling of resources to provide a corresponding level of scale to encountered demand for the resources 718 that are implemented via the platform 716. Accordingly, in an interconnected device embodiment, implementation of functionality described herein is configured for distribution throughout the system 700. For example, in some configurations the functionality is implemented in part on the computing device 702 as well as via the platform 716 that abstracts the functionality of the cloud 714.

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A method comprising:
receiving, at a computing device, a segmented version of a form output by a segmentation network trained to segment an image of a form into different fillable regions;
displaying, by the computing device, the segmented version of the form;
receiving, by the computing device, a correction to at least one of the different fillable regions of the segmented version of the form;
generating, by the computing device using a trained noise generation model comprising a convolutional autoencoder network, noise for the segmented version of the form that represents the correction to the at least one of the different fillable regions, the noise comprising digital image pixels having visual properties that are distinct from adjacent pixels of the segmented version of the form;
providing, by the computing device, the segmented version of the form with the noise as input to the segmentation network; and
causing, by the computing device, the segmentation network to generate a segmented version of another form by propagating the correction represented by the noise to at least one other region of the other form.

2. The method of claim 1, wherein providing the segmented version of the form with the noise as input to the segmentation network and causing the segmentation network to generate the segmented version to the other form is performed independent of modifying internal weights of the segmentation network.

3. The method of claim 1, wherein the at least one other region of the other form is identified by the segmentation network as being semantically similar to the at least one of the different fillable regions corrected by the correction.

4. The method of claim 1, wherein generating the trained noise generation model is trained to generate noise that represents an area of a form to be represented as a fillable portion of the form with an objective of minimizing generated noise.

5. The method of claim 4, further comprising training, by the computing device, the noise generation model by:
inputting training data comprising a plurality of input pairs to the convolutional autoencoder network, each of the plurality of input pairs comprising a segmented form and a ground truth segmentation of the segmented form that identifies fillable regions of the segmented form; and
tasking the convolutional autoencoder network with predicting, for each training pair, noise that represents one or more fillable regions in the segmented form of the training pair.

6. The method of claim 5, wherein training the generation model further comprises:
computing a cross-entropy loss based on a difference between the noise predicted by the convolutional autoencoder network for a training pair and the ground truth segmentation for the training pair; and
modifying one or more internal weights of the noise generation model using the cross-entropy loss.

7. The method of claim 1, wherein the noise causes the segmentation network to:
identify a region of the form that is corrected by the correction;
identify the at least one other region of the other form as being a semantically similar region to the region of the form that is corrected by the correction; and
designate the semantically similar region as being a fillable portion of the other form.

8. The method of claim 1, wherein the correction indicates that two or more fillable regions of the segmented version of the form should be represented as a single fillable region.

9. The method of claim 1, wherein the correction indicates that one fillable region of the segmented version of the form should be represented as two or more fillable regions.

10. The method of claim 1, wherein the correction includes adjusting a position of a fillable region in the segmented version of the form.

11. The method of claim 1, wherein the correction includes modifying one or more dimensions of a fillable region in the segmented version of the form.

12. The method of claim 1, wherein the correction includes modifying a region type associated with a fillable region in the segmented version of the form.

13. The method of claim 1, further comprising generating, by the computing device, the segmented version of the form by inputting a digital image of the form to the segmentation network.

14. The method of claim 1, wherein providing the segmented version of the form with the noise as input to the segmentation network comprises superimposing the noise onto the segmented version of the form prior to input to the segmentation network.

15. A method comprising:
generating, by a processing device, a trained noise generation model configured to output a segmented form with superimposed noise that represents one or more corrections to a form by:
causing an autoencoder network to predict, for each training pair of a plurality of training pairs that each include a segmented form and a ground truth segmentation of the segmented form that identifies fillable regions of the segmented form, noise that represents the fillable regions of the segmented form;
computing a loss function based on a difference between the noise predicted by the autoencoder network for each training pair and the ground truth segmentation for the training pair; and
modifying at least one internal weight of the autoencoder network based on the loss function; and
outputting the autoencoder network with the at least one internal weight as the trained noise generation model.

16. The method of claim 15, wherein the one or more corrections to the form define at least one fillable region of the form that is configured to receive input defining information requested by the form.

17. The method of claim 15, wherein generating the trained noise generation model further comprises:
causing a discriminator portion of the autoencoder network to generate a discriminator prediction that indicates whether the noise predicted by the autoencoder network, when superimposed on the segmented form of a training pair for which the noise was generated, results in a document that is similar to the segmented form of the training pair for which the noise was generated; and
computing the loss function based on the discriminator prediction.

18. The method of claim 15, further comprising:
receiving a segmented form and a correction to at least one fillable region of the segmented form; and
generating a noisy version of the segmented form by providing the segmented form and the correction to the at least one fillable region as input to the trained noise generation model.

19. The method of claim 18, further comprising causing a segmentation network to segment a corpus of forms based on the noisy version of the segmented form, independent of modifying one or more internal weights of the segmentation network, by inputting the noisy version of the segmented form to the segmentation network.

20. A system comprising:
one or more processors; and
a computer-readable storage medium storing instructions that are executable by the one or more processors to perform operations comprising:
receiving a segmented version of a form generated by a segmentation network that is trained to segment an image of a form into different fillable regions;
receiving user input defining a correction to one of the different fillable regions of the segmented version of the form;
generating, using a trained noise generation model comprising a convolutional autoencoder network, noise for the segmented version of the form that represents the correction to the one of the different fillable regions, the noise comprising digital image pixels having visual properties that are distinct from adjacent pixels of the segmented version of the form;
inputting the noise superimposed on the segmented version of the form to the segmentation network; and
causing the segmentation network to generate, for a form of a plurality of forms, a segmented version of the form based on the noise superimposed on the segmented version of the form.

* * * * *